United States Patent [19]

Okonogi et al.

[11] Patent Number: 5,266,202

[45] Date of Patent: Nov. 30, 1993

[54] REVERSE OSMOSIS TREATMENT PROCESS

[75] Inventors: Shigeo Okonogi, Tokyo; Mamoru Tomita, Yokohama; Yasuo Fukuwatari, Kawasaki; Koichi Matsumoto, Tokyo; Yoshitaka Tamura, Yokohama; Teruhiko Mizota, Tokyo; Atsushi Nakajima, Tachikawa; Haruo Endo, Tokoro; Norio Sato, Higashiyamato; Koji Inagaki, Tachikawa, all of Japan

[73] Assignee: The Research and Development Association for Membrane Applications to the Food Industries, Tokyo, Japan

[21] Appl. No.: 655,199

[22] Filed: Feb. 14, 1991

Related U.S. Application Data

[63] Continuation of Ser. No. 224,281, Jul. 25, 1988, abandoned, which is a continuation of Ser. No. 889,050, Jul. 25, 1986, abandoned.

[30] Foreign Application Priority Data

Jul. 25, 1985 [JP] Japan .................................. 60-162816

[51] Int. Cl.$^5$ .............................................. B21D 61/12
[52] U.S. Cl. .................................... 210/637; 210/641; 210/652
[58] Field of Search ................ 210/637, 641, 652, 653, 210/636, 321.65, 651

[56] References Cited

U.S. PATENT DOCUMENTS 3,836,457  9/1974  Gross et al. ..................... 210/196
4,176,057  11/1974 Wheatley et al. ............... 210/137 X
4,670,150  6/1987  Hsiung et al. ................... 210/713 X

OTHER PUBLICATIONS

Sourirajan, S. Editor, *Reverse Osmosis and Synthetic Membranes,* Nat. Res. Con. Canada No. 15627, 1977, pp. 417–443, 448, 449.
Klinkowski, P. R. "Ultrafiltration: An Emerging Unit-Operation", in Sep. Tech. 1, Liq.-Liq. Systems, Larry Ricci, Ed., Chem. Eng. McGraw-Hill, May 8, 1978.
Kesting, Robert E., *Synthetic Polymeric Membranes,* McGraw-Hill Book Co., N.Y., 1971, p. 33.
U.S. Dept. of Commerce, Patent Office Academy Formality Term List, Topic 7d, 1977.
Hiddink et al., J. Dairy Sci, 63, pp. 204–214 (1980), No. 2.
Lim, T. H., et al., J. Dairy Sci., 54, pp. 306–311 (1971), No. 3.
Smith, B. R., Aust. J. Dairy Tech., 33, pp. 57–62, Jun. 1978.

*Primary Examiner*—Frank Spear
*Attorney, Agent, or Firm*—Sughrue, Mion, Zinn, Macpeak & Seas

[57] ABSTRACT

This invention relates to a reverse osmosis treatment process, particularly a stable reverse osmosis treatment process which prevents a lowering in throughput capacity by carrying out treatment while keeping the permeate flux of a reverse osmosis membrane constant through the time of use of a module. The process of this invention can keep the throughput capacity constant, can prevent adhesion and pollution onto membrane surfaces and fouling thereon, and moreover can maintain stable operation in a continuous run.

10 Claims, 5 Drawing Sheets

REVERSE OSMOSIS TREATMENT PROCESS

This is a continuation of application Ser. No. 07/224,281 filed Jul. 25, 1988, now abandoned which is a continuation of application Ser. No. 06/889,050 filed Jul. 25, 1986, now abandoned.

FIELD OF THE INVENTION

This invention relates to a reverse osmosis treatment process, particularly a stable reverse osmosis treatment process which prevents a lowering in throughput capacity by carrying out treatment while keeping the permeate flux of a reverse osmosis membrane constant through the time of use of a module.

Although the reverse osmosis treatment process of this invention is applicable to any solution to be treated so long as the solution is such that the desired end can be attained by applying said process, said process is suitable for the field of food processing.

BACKGROUND OF THE INVENTION

Reverse osmosis treatment process comprises applying a pressure higher than osmotic pressure to separate a solvent from solutes through a reverse osmosis membrane, thereby concentrating the solutes. In general, with an increase of an applied pressure in the range from 2 to 6 MPa, which is within the limit of pressure tightness of the membrane and apparatus, the throughput capacity per unit area of the membrane is increased and the degree of concentration of the solutes can also be increased.

Therefore, when using a multistage continuous reverse osmosis apparatus, which comprises a plurality of reverse osmosis modules connected in series and is operated so as to increase the concentration of solutes successively as a solution to be treated goes downstream, the permeate flux can be kept large when the apparatus is operated by applying to all modules their respective maximum allowable pressures. Accordingly, such an operating method has heretofore been considered an efficient method.

The present inventors have continued investigation on reverse osmosis treatment of dairy products. When a conventional multistage continuous reverse osmosis apparatus was operated for cheese whey by applying to all modules their repective maximum allowable pressures, the present inventors observed the lowering in throughput capacity because of a decrease in permeate flux of the module in each stage with the lapse of time. Such decrease of permeate flux is observed in treatment of other foods such as milk, skim milk, fruit juices, soybean milk and the ultrafiltrated permeates thereof. Skim and the ultrafiltrafiltrated permeates are reported in Hiddink et al., J. Diary Sci, 63, 204 (1980). Cheese whey has been tested by the present inventors, and reported in Lim, T. H., et al., J. Dairy Sci., 54, 306 (1971), and Smith, B. R., Aust. J. Dairy Tech., 33, 57 (1978).

In order to overcome such a decrease of the permeate flux, changing the pH of a solution to be treated and/or introducing a step of frequently washing a treating apparatus has been considered, but these approaches are not always sufficient. Further, in the case of a continuous reverse osmosis treatment process, when successive processes are constructed by carrying out thereafter a cooling procedure or another procedure, a change in the throughput capacity of a reverse osmosis apparatus forces the capacity of the subsequent process to be changed concomitantly, which is a serious problem. A decrease in permeate flux indicates adhesion of solutes onto membrane surfaces and fouling thereon. In processing foods, it is also a serious problem in that frequent washing of the apparatus is necessary.

An object of this invention is to provide a novel reverse osmosis treatment process which can solve these problems.

SUMMARY OF THE INVENTION

An object of this invention is to provide a novel reverse osmosis treatment process which prevents lowering in throughput capacity.

An other object of this invention is to provide a novel reverse osmosis treatment process which prevents decrease of a permeate flux.

A further object of this invention is to provide a novel reverse osmosis treatment process which does not require frequent washing of the apparatus.

According to the experiments of the present inventors, when an average operating pressure to be applied at a feed port to an exhaust port of a module is increased, there is a limit of average operating pressure (a limiting pressure) above which a permeate flux is decreased with continuance of operation, and hence reverse osmosis treatment is carried out at an average operating pressure lower than the limiting pressure. For keeping the throughput capacity constant and as large as possible, it is preferable to employ an average operating pressure below and near the limiting pressure.

As a reverse osmosis apparatus, there is used a reverse osmosis apparatus (a circulating-loop reverse osmosis apparatus) which comprises a plurality of modules, each of said modules being equipped with a circulating loop connecting a feed port and an exhaust port to form a single-stage treating system, said circulating loops of the individual modules being connected in series to form a multistage treating system, and an inlet for feeding solution and an outlet for discharging solution of said reverse osmosis apparatus are present in the circulating loops of a first stage and a last stage, respectively. The average operating pressures in the individual stages are successively increased as stage numbers increase. For increasing the average operating pressures in the individual stages, it is preferable to provide pressure-increasing pumps in or between the circulating loops of the individual modules and increase the average operating pressures in the individual stages by operating these pressure-increasing pumps. In another embodiment, such pressure-increasing pumps are provided both in, as well as between, the circulating loops of the individual modules.

When the reverse osmosis membranes in the individual modules of the above-mentioned circulating-loop reverse osmosis apparatus are successively more porous as stage numbers increase, the permeate flux does not decrease with the lapse of time used for treatment procedure even when the average operating pressures in the individual stages are the same, though in this case, it is also possible to increase the average operating pressures in the individual stages successively as stage numbers increase and thereby carry out a more stable operation.

FIG. 6 (a) shows one example of the above-mentioned circulating-loop reverse osmosis apparatus. Numeral 1 shows a module of the first stage, numeral 2 a module of the second stage, numeral 3 a module of the third stage, numeral 4 a feed pump for a solution to be treated, numeral 5 a pressure control valve, numeral 21 a circulating loop of the module 1 of the first stage, numeral 22 a circulating loop of the module 2 of the second stage, numeral 23 a circulating loop of the module 3 of the third stage, numeral 11 a circulating pump of the circulating loop 21, numeral 12 a circulating pump of the circulating loop 22, and numeral 13 a circulating pump of the circulating loop 23.

FIG. 7 (a) shows one example of an apparatus constructed by providing pressure-increasing pumps between the circulating loops in the above-mentioned circulating-loop reverse osmosis apparatus. Numeral 6 shows a pressure-increasing pump of the circulating loop 22 of the module 2 of the second stage, and numeral 7 a pressure-increasing pump of the circulating loop 23 of the module 3 of the third stage. The other numerals in the drawing show corresponding parts in above FIG. 6.

FIG. 6 (b) is a graph showing the change of pressure and the distribution thereof in the above-mentioned circulating-loop reverse osmosis apparatus of FIG. 6 (a), and FIG. 7 (b) is a graph showing the change of pressure and the distribution thereof in the circulating-loop reverse osmosis apparatus having pressure-increasing pumps of FIG. 7 (a).

It is also possible to further combine back pressure regulating valves with these pressure-increasing pumps and/or circulating pumps properly; to increase the average operating pressures successively as stage number increase; and to adjust the average operating pressures at a desired pressure which is below and near the limiting pressure.

BRIEF DESCRIPTION OF THE DRAWINGS

FIG. 1 (b) is a graph showing the pressure distribution in the apparatus shown in FIG. 1 (a).

FIG. 6 (b) is a graph showing the pressure distribution in the apparatus shown in FIG. 6 (a).

FIG. 7 (b) is a graph showing the pressure distribution in the apparatus shown in FIG. 7 (a).

DETAILED DESCRIPTION OF THE INVENTION

This invention is further illustrated below in detail by way of Experiments and Examples.

Experiment 1

Figure 1:
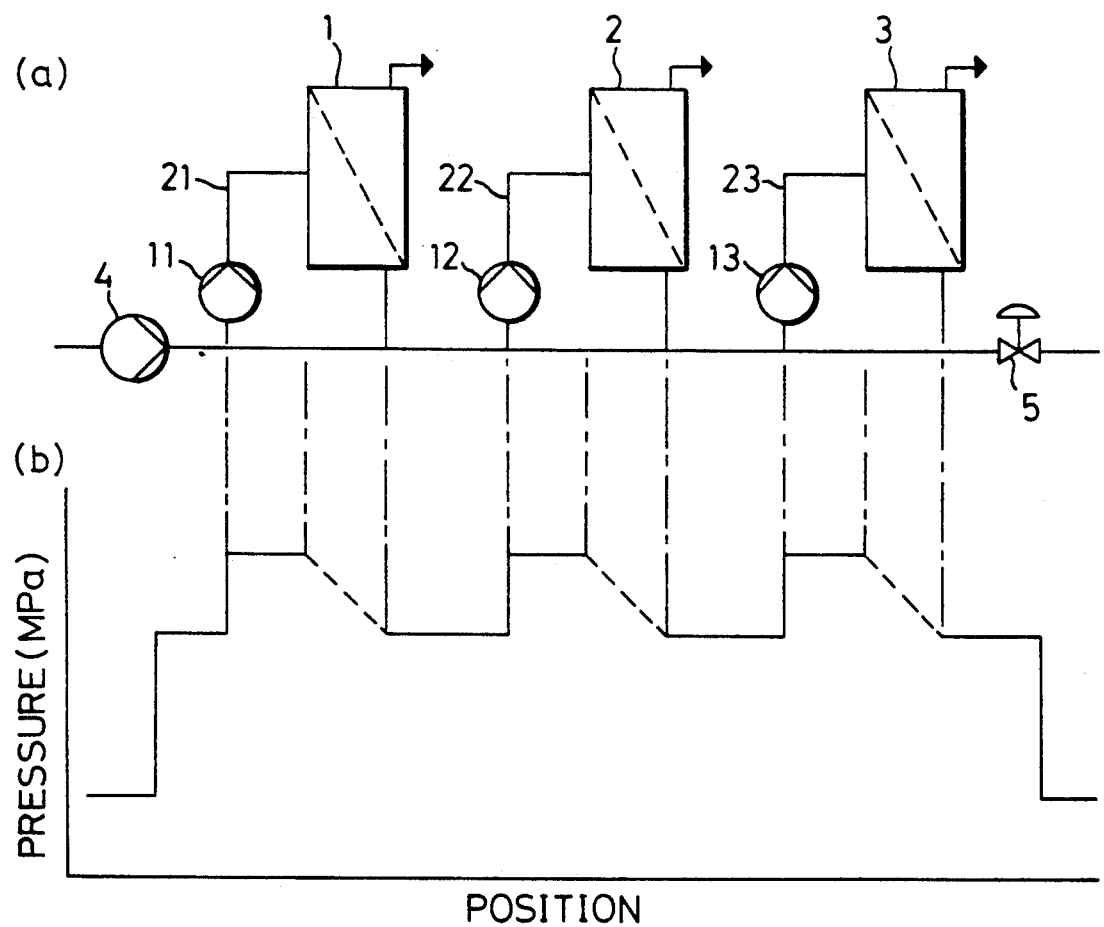
FIG. 1 (a) is a flow sheet of a conventional three-stage continuous reverse osmosis apparatus.

This is an experiment using a conventional method which comprises operating the three-stage continuous reverse osmosis apparatus shown in FIG. 1 (a) by applying a maximum allowable pressure.

In FIG. 1 (a), numeral 1 shows a module of the first stage, numeral 2 a module of the second stage, numeral 3 a module of the third stage, numeral 11 a circulating pump of the first stage, numeral 12 a circulating pump of the second stage, numeral 13 a circulating pump of the third stage, numeral 21 a circulating loop of the first stage, numeral 22 a circulating loop of the second stage, numeral 23 a circulating loop of the third stage, numeral 4 a feed pump for a solution to be treated, and numeral 5 a pressure control valve.

By using cheese whey [fat 0.05% (by weight, hereinafter the same applied), protein 0.8%, lactose 4.65%, ash 0.5%, water 94%, pH6.4] as a solution to be treated, reverse osmosis concentration was conducted in the three-stage continuous reverse osmosis apparatus shown in FIG. 1 (a) under the following treatment conditions.

Treatment conditions:
Number of modules: 3
Type of modules: Intermediate branching type Ar-lamo-26, mfd. by Alfa Laval Co., Ltd.
Effective membrane area: 7.92 m$^2$ (per module)
Reverse osmosis membrane: FL-190 (a trade name, mfd. by Teijin Engineering Co., Ltd.)
Temperature of the solution to be treated: About 40° C.
Average operating pressure in each module: 3.9 MPa
Degree of concentration: 3-fold The degree of concentration was adjusted by adjusting the feed pump for the solution to be treated 4 and the pressure control valve 5 so as to adjust the amount of a product solution (the amount of a concentrate) to about one-third of the amount of the solution to be treated fed by the feed pump for the solution to be treated 4. Each of the circulating pumps 11, 12 and 13 had a capacity of a circulation rate in the module of about 900 liters/hr. The pressure loss in the module was 0.4 MPa. Since the modules were of intermediate branching type, the net discharge rate was about 1,800 liters/hr which was about twice the circulation rate.

FIG. 1 (b) shows a distribution of pressure in a flow path running through the modules 1, 2 and 3 in FIG. 1 (a), referring to FIG. 1 (a) by means of the alternate long and short dash line. The operating pressures in the modules are shown by the dotted line.

Figure 2:
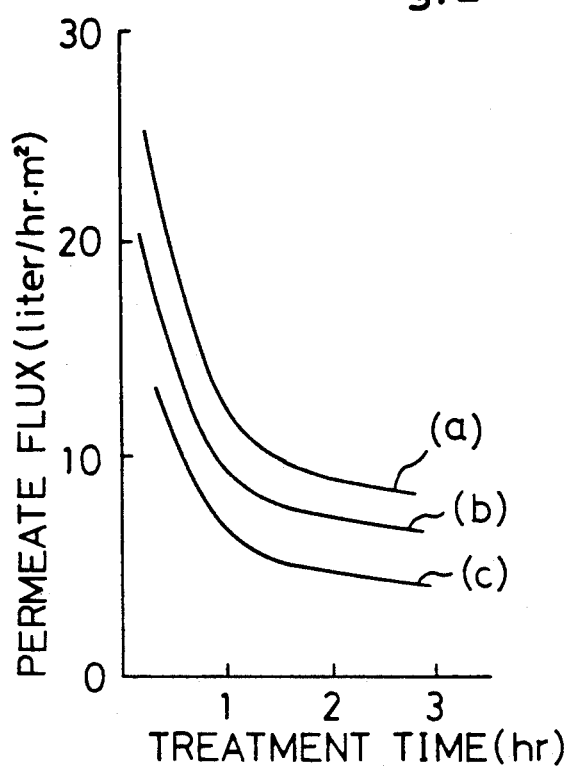
FIG. 2 is a graph showing the change with the lapse of time of the permeate flux in Experiment 1.

As a result of the above-mentioned reverse osmosis treatment, the permeate fluxes of the module in the individual stages showed the changes with lapse of time as shown in FIG. 2. FIG. 2, (a) shows change with the lapse of time in the permeate flux of the module in the first stage, (b) change with the lapse of time in the permeate flux of module in the second stage, and (c) change with the lapse of time in the permeate flux of the module in the third stage.

As a final product solution, a 3-fold concentrated solution having a solids content of about 18% could be obtained, but the permeate fluxes in the individual stages were greatly decreased, so that though the throughput capacity was 500 liters/hr 30 minutes after the commencement of operation, it is lowered to about 220 liters/hr 3 hours after the commencement of operation. From this, it can be seen that in this operation, a stable run cannot be maintained in an industrial operation with respect to throughput capacity.

Experiment 2

Reverse osmosis treatment was carried out in the same manner as in Experiment 1, except the pH of the cheese whey in Experiment 1 was changed to 5.8.

Figure 3:
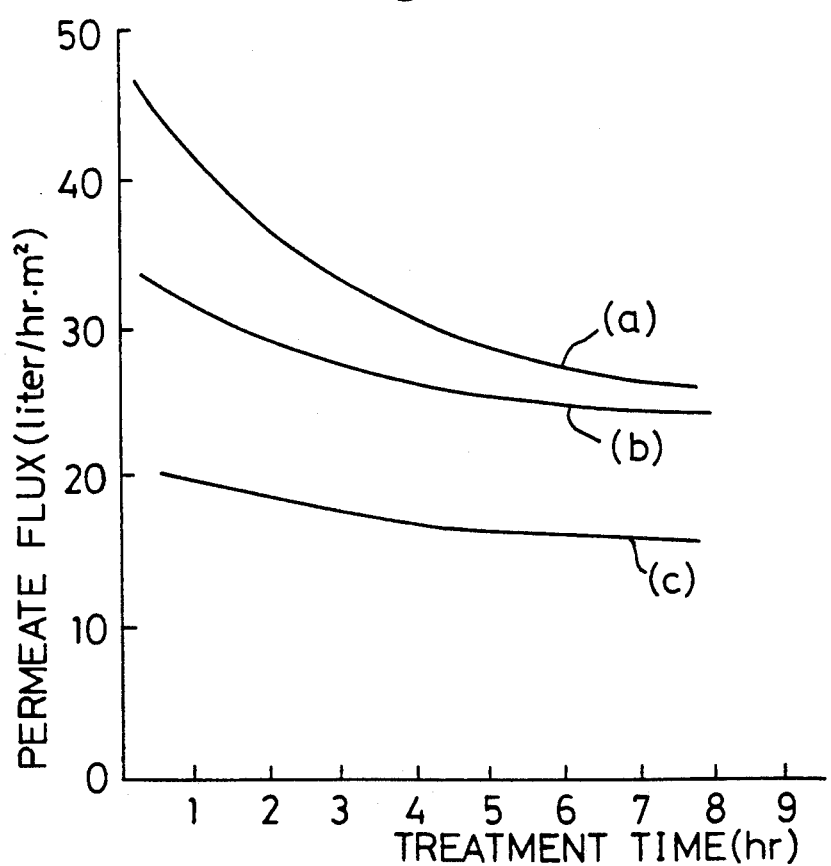
FIG. 3 is a graph showing the change with the lapse of time of the permeate flux in Experiment 2.

The changes with the lapse of time in the permeate fluxes of the module in the individual stages as a result of this experiment are shown in FIG. 3. FIG. 3, (a), (b) and (c) show the corresponding items in Experiment 1.

From the results, it can be seen that though the degree of decrease of the permeate fluxes is reduced by the change of pH of the solution to be treated, the throughput capacity cannot be stably maintained.

From Experiments 1 and 2, it was found that increasing the throughput capacity by increasing the operating pressure as much as possible was disadvantageous in maintaining stable operation. Therefore, the present inventors varied the operating pressure, investigated its relationship with the degree of concentration, the permeate fluxes and the like, and looked for a clue for solving the problems.

Experiment 3

Reverse osmosis treatment was carried out in the same manner as in Experiment 1, except that the cheese whey, as a solution to be treated, had a pH of 6.3 and a solids content of 12% (fat 0.1%, protein 1.6%, lactose 9.3%, and ash 1.0%), the number of modules of the reverse osmosis apparatus was 1 (one-stage treatment), that the treatment temperature was adjusted to about 35° C., and the average operating pressure was set at 1.8 MPa for about 28 minutes after the commencement of operation, and then at 3.9 PMa for 16 minutes.

Figure 4:
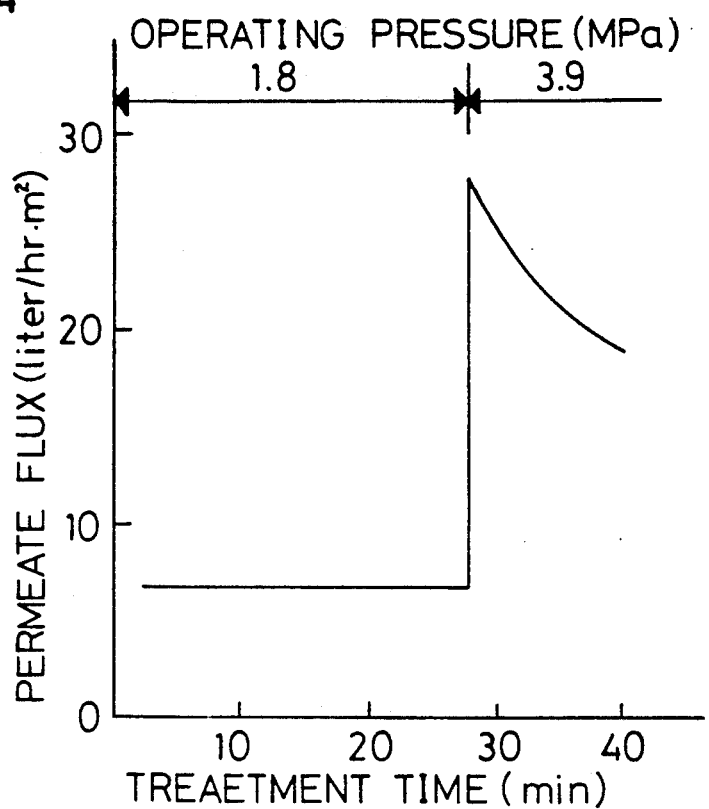
FIG. 4 is a graph showing the change with the lapse of time of the permeate flux in Experiment 3.

The change of the permeate flux with the lapse of time in this experiment is shown in FIG. 4.

According to FIG. 4, there was no decrease permeate flux at all at a low operating pressure of 1.8 MPa, while at a high pressure of 3.9 MPa, the permeate flux was decreased rapidly with the lapse of time. From this, it can be seen that when an average operating pressure is low, a permeate flux can be kept constant though at a low level.

Experiment 4

Figure 5:
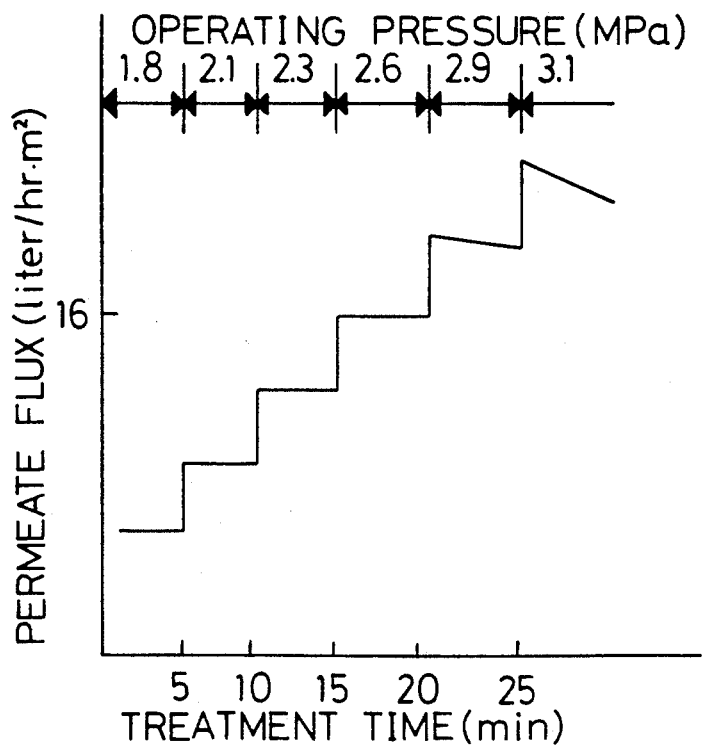
FIG. 5 is a graph showing the change with the lapse of time of the permeate flux in Experiment 4.

Reverse osmosis treatment was carried out in the same manner as in Experiment 3, except that the operating pressure in Experiment 3 was replaced by setting operation pressures at more fixed points than that of Experiment 3 and increasing operating pressure from 1.8 MPa to 3.1 MPa as shown in FIG. 5.

In this experiment, there can be investigated the relationship between average operating pressure and maximum permeate flux which can be kept constant, namely, which is not lowered.

The results are as shown in FIG. 5.

From FIG. 5, it can be seen that when the operating pressure is 2.6 MPa, a maximum permeate flux of 16.4 liters/hr which is not lowered with the lapse of time, can be attained and at an operating pressure of 2.6 MPa or below, the permeate flux can be kept constant. That is to say, it can be seen that the operating pressure for keeping the permeate flux constant with the lapse of time has an upper limit (a limiting pressure), and that when the operating pressure is equal to or lower than the upper limiting pressure, it can be possible to keep the permeate flux constant with the lapse of time, namely, to keep the throughput capacity constant. Further, it can be seen that when the operating pressure is set below and near the limiting pressure, it is possible to keep the permeate flux at a high constant value with the lapse of time, namely, to keep the permeate flux at a value at which the throughput capacity is high.

Experiment 5

In the present experiment, how the limiting pressure and the maximum constant permeate flux change with a change of the degree of concentration of a solution to be treated, was investigated.

Reverse osmosis treatment was carried out in the same manner as in Experiment 1, except that in place of the three-stage continuous treatment, there was employed a process which comprises holding the solution subjected to continuous treatment in the first stage in a tank (not shown in the drawings) outside the system, subjecting the solution to continuous treatment in the second stage, holding the solution in another tank (not shown in the drawings) outside the system, and finally subjecting the solution to continuous treatment in the third stage to obtain a final concentrated solution. The limiting pressures and the maximum constant permeate fluxes (the maximums of the permeate fluxes which did not decrease with the lapse of time) were determined in the individual stages.

Further, the same reverse osmosis treatment as described above was carried out, except that the cheese whey in Experiment 2 was used as a solution to be treated.

The results were as shown in Table 1.

TABLE 1

| | Change of limiting pressure and maximum contant permeate flux with change of degree of concentration | | | |
|---|---|---|---|---|
| | Stage | First stage | Second stage | Third stage |
| Solution to be treated | Solid content of the resulting cheese whey (%) | About 8 | About 13 | About 18 |
| Cheese whey of Example 1 | Maximum constant permeate flux (l/hr · m²) | 8.1 | 6.2 | 3.7 |
| | Average operating pressure (MPa) | 1.24 | 1.64 | 2.05 |
| Cheese whey of Example 2 | Maximum constant permeate flux (l/hr · m) | 25.5 | 23.9 | 15.2 |
| | Average operating pressure (MPa) | 2.18 | 2.93 | 3.29 |

From Table 1, it can be seen that when the treatment is carried out by using the same reverse osmosis membrane, an increase of the concentration of each solution to be treated results in a decrease of the maximum constant permeate flux and an increase of the limiting pressure. Therefore, it can be seen that in the case of a continuous reverse osmosis apparatus comprising modules and their respective circulating loops connected in series, namely, comprising stages connected in series, it is necessary for attainment of a maximum constant permeate flux in each stage to increase the operating pressures in the individual stages successively as stage numbers increase. Accordingly, conventional apparatuses having the arrangement pumps shown in FIG. 1 (a) cannot be used because the average operating pressures in the individual stages of these apparatuses are constant as shown in FIG. 1 (b).

From the results of Experiments 1 to 5, the following becomes apparent.

(1) It is known that in reverse osmosis treatment of foods such as whey, milk, skim milk, fruit juices, soybean milk and the ultrafiltrated permeates thereof, the permeate flux decreases with the lapse of time under a conventional operating pressure, but when the average operating pressure is set equal to or below a certain value, the permeate flux does not decrease. That is to say, an upper limiting pressure is present and is an operating pressure at which the permeate flux can be kept constant.

(2) At the pressure equal to or below the limiting pressure in above (1), the constant permeate flux (a permeate flux which does not decrease with the lapse of time) also increases with an increase of the average operating pressure, so that a maximum constant permeate flux can be attained at the limiting pressure.

(3) The maximum constant permeate flux depends on physical properties of a solution to be treated, and with an increase of the degree of concentration of the solution to be treated, the maximum constant permeate flux decreases but the limiting pressure increases.

Experiment 6

All the reverse osmosis membranes in the reverse osmosis apparatus used in Experiments 1 to 5 were similar in kind and had the same porosity. In the present experiment, the relationship between kind (the porosity) of reverse osmosis membrane, maximum constant permeate flux, and limiting pressure was examined.

Reverse osmosis treatment was carried out in the same manner as in Experiment 4, except for use of a reverse osmosis membranes FL-198 and FL-170 (trade names, both mfd. by Teijin Engineering Co., Ltd.), the former being more porous than the reverse osmosis membrane FL-190 used in Experiment 4, and the latter being more porous than FL-190.

As a result, when the reverse osmosis membrane FL-198 was used, the limiting pressure was 3.23 MPa and the maximum constant permeate flux was 16.4 liters/hr·m². When the reverse osmosis membrane FL-170 was used, the limiting pressure was 2.33 MPa and the maximum constant permeate flux was 16.4 liters/hr·m².

From these results, it can be seen that the limiting pressure increases as reverse osmosis membrane becomes less porous and decreases as reverse osmosis membrane becomes more porous, but that the maximum constant permeate flux is constant regardless of the porosity of reverse osmosis membrane.

Experiment 7

Based on the finding in Experiment 6, the experiments were carried out in order to confirm that the limiting pressure can be kept substantially constant by substituting the apparatus with serial reverse osmosis membranes which are arranged to be more porous as stage numbers increase.

Reverse osmosis treatment was carried out in the same manner as in Experiment 5, except that FL-198, having a less porous than FL-190 was used as a reverse osmosis in the first stage and FL-170, having a more porous membrane as a reverse osmosis membrane in the third stage, and the operating pressures in the individual stages were adjusted so as to be close to the operating pressures in the second stage in Experiment 5.

The results were as shown in Table 2.

TABLE 2

Change of limiting pressure and maximum constant permeate flux with change of the porosity of reverse osmosis membrane

| Stage | | First stage | Second stage | Third stage |
|---|---|---|---|---|
| Solution to be treated | Solid content of the resulting cheese whey (%) | About 8 | About 13 | About 18 |
| Cheese whey of Example 1 | Maximum constant permeate flux (l/hr · m²) | 8.18 | 6.2 | 3.75 |
| | Average operating pressure (MPa) | 1.56 | 1.64 | 1.64 |
| | Reverse osmosis membrane type | FL-198 | FL-190 | FL-170 |
| Cheese whey of Example 2 | Maximum constant permeate flux (l/hr · m) | 25.5 | 23.9 | 15.2 |
| | Average operating pressure (MPa) | 2.93 | 2.93 | 2.95 |
| | Reverse osmosis membrane type | FL-198 | FL-190 | FL-170 |

When the results shown in Table 2 are compared with the results shown in Table 1 in Experiment 5, it can be seen that the maximum constant permeate fluxes were substantially the same, and the average operating pressures of the first stage was raised and that of the third stage was lowered.

Thus, in order to make the permeate fluxes of individual modules maximum and constant and maintain the throughput capacity stably in continuous reverse osmosis treatment, it is advisable to use a reverse osmosis apparatus comprising a plurality of modules, each of said modules being equipped with a circulating loop connecting a feed port and an exhaust port for solution to be treated to each other to form a single-stage treating system, said circulating loops of the individual stages being connected in series to form inlet multistage treating system, and a feed for solution and an outlet for discharge of solution of said reverse osmosis apparatus formed in the circulating loops of the first stage and the last stage, respectively, in which the of reverse osmosis membranes fitted to the individual stages are successively more porous as stage numbers increase, and the limiting pressures at the individual stages are set so as to be substantially the same by maintaining the average operating pressures in the individual stages so as to be substantially the same, namely, changing the kinds of reverse osmosis membranes of the individual stages so as to be successively more porous as stage numbers increased.

As a reverse osmosis apparatus in this case, a conventional-type one shown in FIG. 1 (a) can also be used.

According to the results of the experiments described above, as a continuous reverse osmosis treatment process which aims at stable maintenance of the throughput capacity at average operating pressures equal to or below the limiting pressure, there are a process in which the operating pressures are successively increased as stage numbers increase, and a process in which the of reverse osmosis membranes are successively more porous as stage numbers increase. There can also be employed a process comprising the combination of these processes, namely, a process in which the reverse osmosis membranes are successively more porous decreased as stage numbers increased, and the operating pressures are successively increase as the stage numbers become increased.

Illustrative examples of this invention are explained below, but this invention is not limited to these examples.

DESCRIPTION OF THE PREFERRED EMBODIMENTS

Example 1

As a treating apparatus, a continuous reverse osmosis apparatus for a single-stage treatment was used in place of the three-stage continuous reverse osmosis apparatus shown in the flow sheet of FIG. 1 (a). The module used was Arlamo-26 (a trade name, mfd. by Alpha Laval Co., Ltd.), which was fitted a reverse osmosis membrane FL-190 (a trade name, mfd. buy Teijin Engineering Co., Ltd., PBIL type having a salt rejection percentage of about 90%). The effective membrane area of each module was 7.92 m$^2$.

An experiment in which average operating pressure was successively increased was previously conducted in the same manner as in Experiment 4 to confirm that the limiting pressure was 3.09 MPa.

Cheese whey (fat 0.05%, protein 0.8%, lactose 4.65%, ash 0.5%, water 94%, pH 6.4) was used as a solution to be treated, the temperature in the module was adjusted to 10° C., the solution to be treated was fed at a rate of 129 liters/hr by means of a feed pump 4 for solution to be treated, the average circulation rate in the module was adjusted to about 900 liters/hr by means of a circulating pump 11, and operation was conducted while adjusting the average operating pressure to 1.5 MPa by operating a pressure control valve 5.

In this treatment procedure, the water permeate flux reached a steady value of 5.7 liters/hr·m$^2$ at 30 minutes after the commencement of operation and was constant without any change even after 2 hours and 34 minutes. During this period of time, whey concentrated to a total solids content of 9% could be stably obtained at a rate of 84 liters/hr.

Example 2

By using the same apparatus and solution to be treated as in Example 1, operation was conducted in the same manner as in Example 1, except that the feed rate by means of the feed pump 4 for solution to be treated was adjusted to 378 liters/hr, and the average operating pressure was adjusted to 2.9 MPa by operating the pressure control valve 5.

A steady state was achieved after 30 minutes operation, and the operation was allowed to continue for 2 hours and 38 minutes subsequently. The value of water permeate flux was 16.5 liters/hr·m$^2$ 30 minutes after the commencement of operation and the value still remained 16.4 liters/hr·m$^2$ even after the subsequent operation of 2 hours and 38 minutes. The whey concentrated, up to a total solids content of 9%, could be stably obtained at a rate of 248 liters/hr by the mode of operation as described above.

Example 3

There was used a reverse osmosis apparatus comprising three identical single-stage apparatuses as used in Example 1 which were arranged in series, and tanks for balance placed between them. The same solution to be treated as in Example 1 was used, and the same module and average circulation rate in module as in Example 1 were also employed, but the operation temperature was adjusted to 40° C.

The average solids content in the module after concentration in the first, second and third stages were predetermined to be about 8.5%, about 12.5% and about 18%, respectively, and experiments in which the average operating pressure was successively increased were previously carried out for wheys having each of these solids concentrations in the same manner as in Experiment 4 to confirm that the limiting pressures in the first, second and third stages were 1.24 MPa, 1.64 MPa and 2.05 MPa, respectively.

Whey having a solids content of 6% was fed to the reverse osmosis apparatus of the first stage at a rate of 205 liters/hr by means of a feed pump 4 for solution to be treated and circulated through a module by means of a circulating pump, and operation was conducted while adjusting the average operating pressure to 1.24 MPa by operating a control valve at the outlet of the first stage. A steady state was achieved at 30 minutes after the commencement of operation, and the whey concentrated, up to a total solids content of 8.56%, could be obtained at a stable rate of 141 liters/hr for 2 hours. During this period of time, the water permeate flux was maintained at 8.08 liters/hr·m$^2$.

The concentrate obtained was once received in a balance tank, and this whey was fed to the next reverse osmosis apparatus of the second stage at a rate of 141 liters/hr in the same manner as with the feed to the first stage and circulated through a module by means of a circulating pump. The average operating pressure was adjusted to 1.64 MPa in the same manner as in the first stage. A steady state was achieved at 30 minutes after the commencement of operation, and the whey concentrated, up to a total solids content of 12.75%, could be obtained at a stable capacity of 92 liters/hr for 2 hours. During this period of time, the water permeate flux was maintained at 6.19 liters/hr·m$^2$.

The concentrate obtained was once received in a balance tank, and this whey was fed to the next reverse osmosis apparatus of the third stage at a rate of 92 liters/hr in the same manner with the feed to the second stage and circulated through a module by means of a circulating pump. The average operating pressure was adjusted to 2.04 MPa in the same manner as in the first stage. A steady state was achieved at about 30 minutes after the commencement of operation and whey the concentrated, up to a total solids content of 17.95%, could be obtained at a stable rate of 63 liters/hr for 2 hours. During this period of time, the water permeate flux was maintained at 3.66 liters/hr·m$^2$.

Example 4

Figure 6:
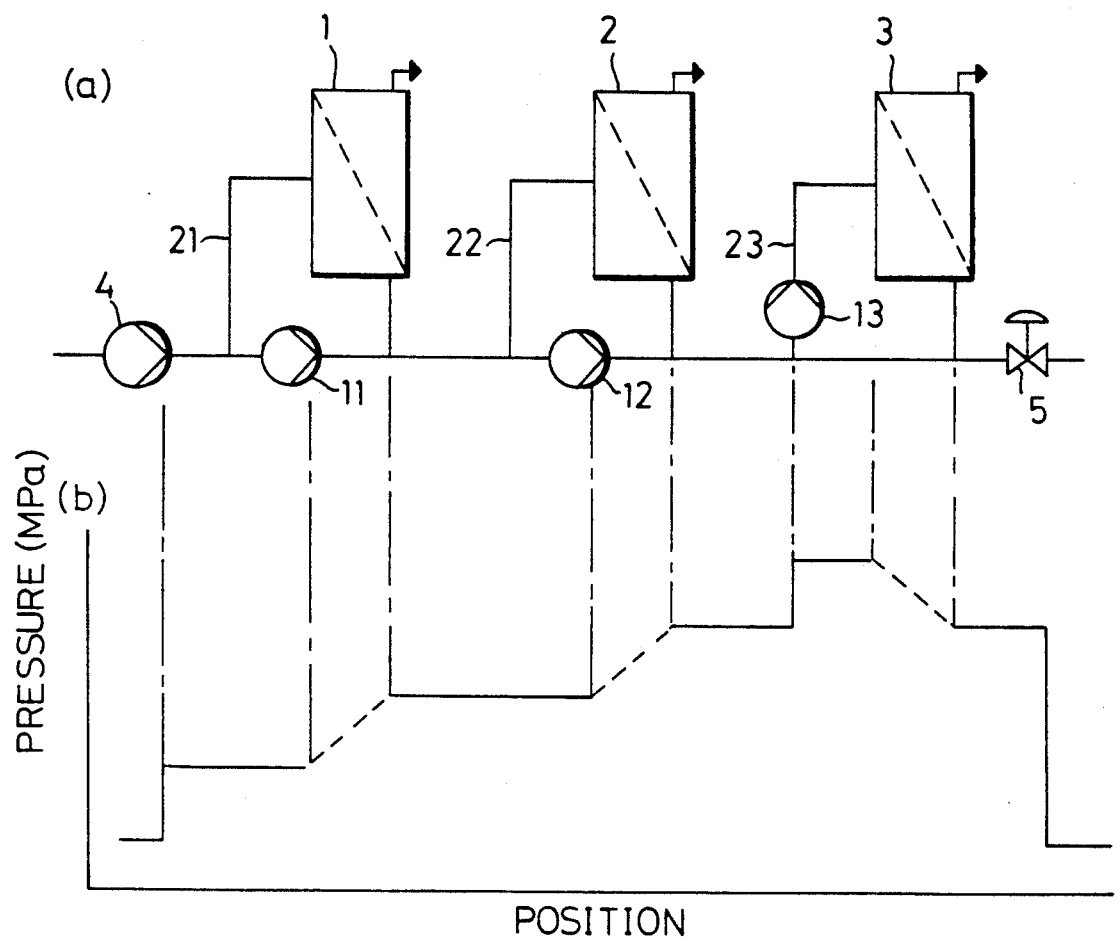
FIG. 6 (a) is a flow sheet of one example of a reverse osmosis treatment apparatus used in this invention.

The three-stage continuous reverse osmosis apparatus shown in FIG. 6 (a) was used. The same modules, reverse osmosis membranes, and solution to be treated as in Example 1 were used, and the average circulation rate in the modules was adjusted to 900 liters/hr.

The average solids contents in the modules in the first, second and third stages in the case of 3-fold concentration were predetermined to be about 8.5%, about 12.5% and about 18%, respectively, and the experiments in which the average operating pressure was successively increased were previously carried out for wheys having each of these solids concentrations in the same manner as in Example 4 to confirm that the limiting pressures in the first, second and third stages in the case of operation at 40° C. were 1.24 MPa, 1.64 MPa and 2.05 MPa.

Cheese whey was fed at a temperature of 40° C. at a flow rate of 205 liters/hr by means of a feed pump 4 for solution to be treated and circulated through the modules by means of circulating pumps 11, 12 and 13, respectively, and operation was conducted while adjusting the average operating pressures in the first, second and third stages to 1.24 MPa, 1.64 MPa and 2.04 MPa, respectively, by means of a pressure control valve 5 and control valves (not shown in the drawings) after the respective modules, and adjusting the temperatures in the modules to about 40° C. A steady state was achieved at 60 minutes after the commencement of operation, and the water permeate fluxes in the individual stage were 8.08 liters/hr·m$^2$, 6.19 liters/hr·m$^2$ and 3.66 liters/hr·m$^2$ in the first, second and third stages, respectively, and did not change for 7 hours after the commencement of operation. Whey concentrated to a total solids content of 18% could be stably obtained at a capacity of 63 liters/hr.

Example 5

Figure 7:
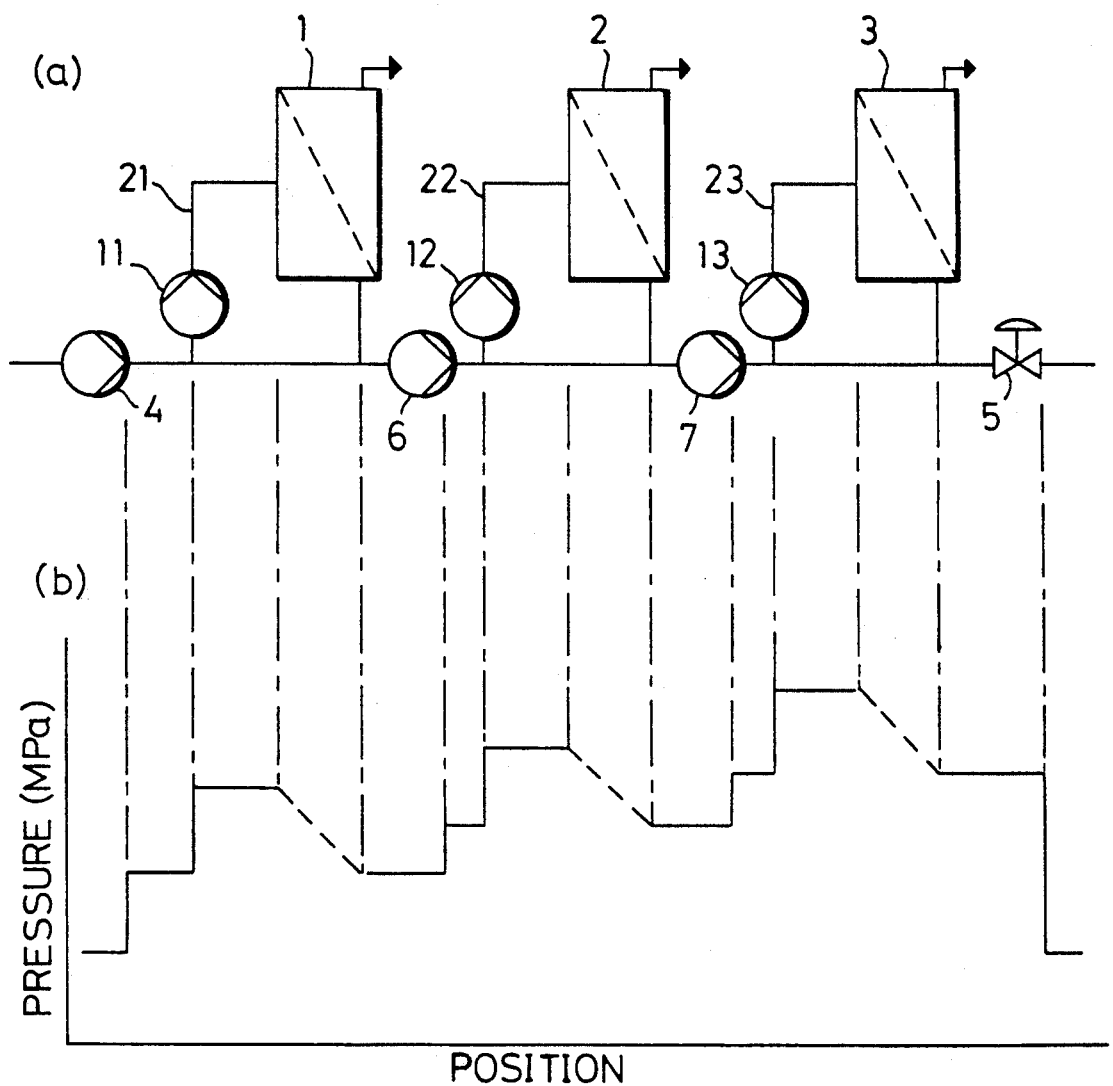
FIG. 7 (a) is a flow sheet of another example of a reverse osmosis treatment apparatus used in this invention.

The three-stage continuous reverse osmosis apparatus shown in FIG. 7 (a) was used. The modules and the reverse osmosis membranes used were the same as in Example 4, but pressure-increasing pumps 6 and 7 were placed between the circulating loop of the first stage and the circulating loop of the second stage and between the circulating loop of the second stage and the circulating loop of the third stage, respectively.

As a solution to be treated, there was used the same cheese whey as in Example 1, except that its pH was adjusted to pH 5.8 by dissolution of carbon dioxide. The cheese whey was intended to be concentrated 3-fold at 40° C., and the average solids contents in the individual modules in the first, second and third stages in this case were predetermined to be 7.7%, 11.6% and 17.4%, respectively. Experiments in which the operating pressure was successively increased were previously carried out for wheys having each of these solids concentrations in the same manner as in Example 4 to confirm that the limiting pressures in the first, second and third stages in the case of operation at 40° C. were 2.18 MPa, 2.93 MPa and 3.29 MPa, respectively.

Cheese whey as a solution to be treated was fed at 736 liters/hr by means of a feed pump 4 for solution to be treated and circulated through the modules by means of circulating pumps 11, 12 and 13, respectively. Operation was conducted while adjusting the average operating pressures in the first, second and third stages to 2.16 MPa, 2.91 MPa and 3.27 MPa, respectively, by operating a pressure control valve 5 and control valves (not shown in the drawings) after the respective modules and by operating the pressure-increasing pumps 6 and 7, and while adjusting the temperature to 40° C. A steady state was achieved at 30 minutes after the commencement of operation, and the water permeate fluxes in the individual stages were 25.1 liters/hr·m$^2$, 23.7 liters/hr·m$^2$ and 14.9 liters/hr·m$^2$ in the first, second and third stages, respectively, and did not change 7 hours after the commencement of operation. Concentrated whey having a total solids content of 18% could be stably obtained at a rate of 232 liters/hr.

Example 6

The three-stage continuous reverse osmosis apparatus shown in FIG. 1 (a) was used. The same module as in Example 1 was used, but as reverse osmosis membranes, FL-198, FL-190 and FL-170 (individually trade names, mfd. by Teijin Engineering Co., Ltd.) were used in the first, second and third stages, respectively. These reverse osmosis membranes become more porous in that order, but each of them had an effective membrane area of 7.92 m$^2$.

The same cheese whey as in Example 5 was used as a solution to be treated, and was intended to be concentrated 3-fold as in Example 5, and the average solids contents in the individual modules in the first, second and third stages in this case were predetermined to be 7.7%, 11.6% and 17.4%, respectively.

Experiments in which the operating pressure was successively increased were previously carried out for wheys having each of these solids concentrations in the same manner as in Example 4 to confirm that the limiting pressures in the first, second and third stages in the case of operation at 40° C. were 2.93 MPa, 2.93 MPa and 2.95 MPa, respectively.

The cheese whey as a solution to be treated was fed at a temperature of 40° C. at a flow rate of 720 liters/hr by means of a feed pump 4 for the solution to be treated, and circulated through the modules at a circulation rate of about 900 liters/hr by means of circulating pumps 11, 12 and 13, respectively. Operation was conducted while adjusting the average operating pressures of all the modules to 2.9 MPa by operating a pressure control valve 5 and control valves (not shown in the drawings) after the respective modules, and adjusting the temperature to 40° C. A steady state was achieved at about 30 minutes after the commencement of operation, and the water permeate fluxes in the individual stages were 25.0 liters/hr·m$^2$, 23.4 liters/hr·m$^2$ and 14.5 liters/hr·m$^2$ in the first, second and third stages, respectively, and did not change for 7 hours after the commencement of operation. Concentrated whey having a total solids content of 18% could be stably obtained at a capacity of 222 liters/hr.

Example 7

The three-stage continuous reverse osmosis apparatus shown in FIG. 7 (a) was used. There was employed a flow mode different from that employed in Example 6, but the module used and the membranes used the same as in Example 6.

The same cheese whey as in Example 1 was used as a solution to be treated, and was intended to be concentrated 3-fold at 40° C., and the average solids contents in module in the individual stages in this case were predetermined to be 8.5%, 12.5% and 18% in the first, second and third stages, respectively. Experiments in which the operating pressure was successively increased were previously carried out for wheys having each of these solids concentrations in the same manner as in Example 4 to confirm that the limiting pressures in the first, second and third stages in the case of operation at 40° C. were 1.56 MPa, 1.64 MPa and 1.64 MPa, respectively.

Cheese whey as a solution to be treated was fed at a temperature of 40° C. at a flow rate of 195 liters/hr by means of a feed pump 4 for solution to be treated, and circulated through the modules at a circulation rate of 900 liters/hr by means of circulating pumps 11, 12 and 13, respectively. Operation was carried out while adjusting the average operating pressure of the module in the first stage to 1.54 MPa by adjustment of a pressure control valve 5 and control valves (not shown in the drawings) after the respective modules, adjusting the average operating pressure of module in the second stage to 1.58 MPa by further operation of a pressure-increasing pump 6, adjusting the average operating pressure of module in the third stage to 1.62 MPa by still further operation of a pressure-increasing pump 7, and adjusting the temperatures in all the modules to 40° C. A steady state was achieved at about 60 minutes after the commencement of operation, and the water permeate fluxes in the individual stages were 7.78 liters/hr·m², 5.65 l/hr·m² and 3.66 liters/hr·m² in the first, second and third stages, respectively, and did not change for 5 hours after the commencement of operation. During this period of time, concentrated whey having a total solids content of about 18% could be stably obtained at a capacity of 60 liters/hr.

Since the reverse osmosis treatment process of this invention makes it possible to carry out treatment while keeping the permeate flux of a reverse osmosis membrane constant with the lapse of time, it can it maintain the throughput capacity constant, can prevent adhesion and pollution onto membrane surfaces and fouling thereon, and moreover it can maintain stable operation in a continuous run.

What is claimed is:

1. A reverse osmosis treatment process which comprises, carrying out treatment while adjusting an average operating pressure within a module of a reverse osmosis apparatus from a feed port to an exhaust port of said module so that said average operating pressure is equal to or lower than a limiting pressure at which a permeate flux through a membrane of said module has a maximum constant value through the time of use of said module, said adjusting providing substantially constant throughput capacity during said treatment, wherein the reverse osmosis apparatus comprises a plurality of modules, each of said modules being equipped with a circulating loop connecting a feed port and an exhaust port for solution to be treated to each other to form a single-stage treating system, said circulating loops of the individual stages being connected in series to form a multistage treating system, and an inlet for feed of solution and an outlet for discharge of solution of said reverse osmosis apparatus formed in the circulating loops of a first stage and a last stage, respectively, and wherein the average operating pressures in the individual stages are successively increased as stage number increases.

2. A reverse osmosis treatment process according to claim 1, wherein the average operating pressure is adjusted to be below and near the limiting pressure.

3. A reverse osmosis treatment process according to claim 1, wherein the average operating pressures adjusted in the individual modules are increased by means of pressure-increasing pumps provided in the circulating loops of the individual modules.

4. A reverse osmosis treatment process according to claim 1, wherein the reverse osmosis apparatus comprises a plurality of modules, each of said modules being equipped with a circulating loop connecting a feed port and an exhaust port for solution to be treated to each other to form a single-stage treating system, an inlet for feed of solution and an outlet for discharge of solution of said reverse osmosis apparatus formed in the circulating loops of a first stage and a last stage, respectively, and reverse osmosis membranes provided in the individual stages, said reverse osmosis membranes being more porous successively as stage numbers increase, and in that the average operating pressures in the individual stages are maintained so as to be substantially the same.

5. A reverse osmosis treatment process according to claim 1, wherein the reverse osmosis apparatus comprises a plurality of modules, each of said modules being equipped with a circulating loop connecting a feed port and an exhaust port for solution to be treated to each other to form a single-stage treating system, said circulating loops of the individual stages being connected in series to form a multistage treating system, an inlet for feed solution and an outlet for discharge of solution of said reverse osmosis apparatus formed in the circulating loops of a first stage and a last stage, respectively, and reverse osmosis membranes provided in the individual stages, said reverse osmosis membranes being more porous successively as stage numbers increase, and in the average operating pressures in the individual stages are successively increased as stage numbers increase.

6. A reverse osmosis treatment process according to claim 1, wherein the solution to be treated is selected from the group consisting of milk, skim milk, cheese whey, soybean milk and fruit juices.

7. A reverse osmosis treatment process according to claim 1, wherein the solution to be treated is selected from the group consisting of ultrafiltrated permeates of milk, skim milk, cheese whey, soybean milk and fruit juices.

8. A reverse osmosis treatment process according to claim 1, wherein the average operating pressures adjusted in the individual modules are increased by means of pressure-increasing pumps provided between the circulating loops of the individual modules.

9. A reverse osmosis treatment process according to claim 1, wherein the average operating pressure adjusted in the individual modules are increased by means of pressure-increasing pumps provided both in and between the circulating loops of the individual modules.

10. A method for preventing lowering of throughput capacity in a stable, reverse osmosis treatment process, comprising carrying out said treatment using a plurality of reverse osmosis modules wherein each of said modules is equipped with a circulating loop connecting a feed port and an exhaust port for solution to be treated to each other to form a single-stage treating system, said circulating loops of the individual stages being connected in series to form a multistage treating system, and an inlet for feed of solution and an outlet for discharge of solution of said reverse osmosis module formed in the circulating loop of a first stage and a last stage, respectively, means within each circulating loop for regulating the average operating pressure within each module wherein the average operating pressures in the individual stages are successively increased as stage number increases, and a reverse osmosis membrane inside each module; and after commencing said treatment, adjusting the average operating pressure within each module from the feed port to the exhaust port so that the average operating pressure is equal to or lower than a limiting pressure, the limiting pressure being that pressure at which the permeate flux through said reverse osmosis membrane has a maximum constant value through the time of use of said treatment using said module, whereby said adjusting of the average operating pressure so as to be equal to or lower than the limiting pressure provides substantially constant throughput capacity during said treatment.

* * * * *